UNITED STATES PATENT OFFICE.

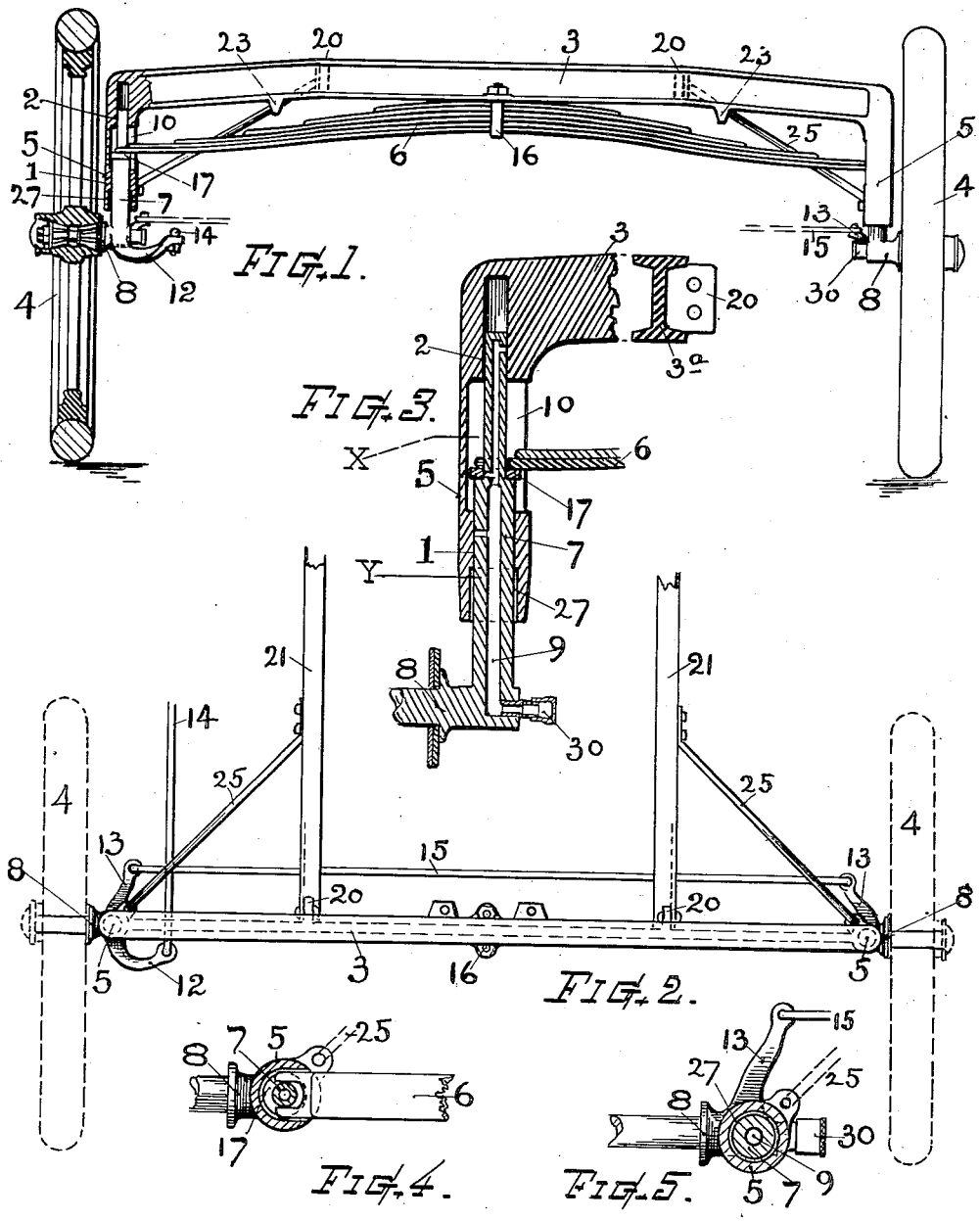

FRANK O. WOODLAND, OF WORCESTER, MASSACHUSETTS.

FRONT SUSPENSION FOR AUTOMOBILES.

1,112,584.　　　　　Specification of Letters Patent.　　　Patented Oct. 6, 1914.

Application filed June 19, 1913.　Serial No. 774,578.

*To all whom it may concern:*

Be it known that I, FRANK O. WOODLAND, a citizen of the United States, residing at Worcester, in the county of Worcester and State of Massachusetts, have invented a new and useful Front Suspension for Automobiles, of which the following is a specification, reference being made therein to the accompanying drawings.

This invention relates to an improved construction for the front suspension or axles of automobiles, motor-cars, or similar vehicles; the object being to provide a simple, efficient and economical structure comprising an axle and wheel supporting means which can be readily manufactured and assembled; and consisting of comparatively few parts.

To this end my invention consists in a front suspension means, the parts of which are constructed and combined substantially as shown in the drawings and hereinafter described; the particular subject matter claimed being definitely expressed in the summary.

In the drawings, Figure 1 is a front view of a structure embodying my invention. Fig. 2 is a top plan view. Fig. 3 is a vertical section through one of the end sockets. Fig. 4 is a cross-section at line X, and Fig. 5 is a cross-section at line Y.

Referring to the drawings, the numeral 3 indicates the axle-beam; 4 the wheels and 6 the spring. The axle-beam, which is preferably drop-forged of steel and made of I-shaped cross-section, as 3ª, is provided at each end with an upright socket 5 having a cylindrical bore which opens from the lower end and is adapted for receiving and supporting a swivel-standard or spindle 7 attached to the wheel-bearing axle 8. Said socket is bored out with different diameters of bearing surfaces 1 and 2 at its upper and lower portions, and has a side-opening 10 into which the end of the spring 6 can enter. The wheel-bearing axles or swivel members 8 are integral with the spindles 7, and are also provided with arms 12 and 13 for the pivotal attachment thereto of the steering connections 14 and cross-rod 15. The spring 6 is a half-elliptic flat leaf spring underlying and connected with the central part of the axle-beam by U-shaped bolt 16. Its ends, which are properly slotted, extend into the open side of the sockets beneath the ends of the axle-beam, and are there supported by a ledge or annular shoulder upon the spindle or swivel member; a seat-plate or washer 17 being preferably arranged between the shoulder and spring. The axle-beam and parts carried thereby are thus yieldingly upheld by the spring, while the sockets can move up and down on the swiveling spindles, and the wheel-axle members and spindles can play up and down with the inequalities of the road, and also swing with the action of the steering mechanism applied through the agency of the rod 14.

Lugs 20 are formed on the axle for the attachment of the chassis or frame 21, said parts being assembled with the ends of the frame abutting against the axle and held by rivets through the lugs.

Buffer projections 23 are preferably formed on the under side of the axle against which the spring 6 can strike when subjected to excessive compression, thereby shortening the effective leverage of the spring. Said projections can be in some instances omitted, if so desired.

The lower part of the sockets 5 are preferably connected by rigid braces 25 with sides of the chassis frame. The lower end of the bearing-socket 5 extends below the end of the bearing surface 2, (see Fig. 3) and is chambered, as at 27, or made of slightly larger internal diameter than the diameter of the lower bearing surface in the socket or neck of the spindle 7; thereby affording space between the circumference of the spindle and interior of the socket. This construction serves for the purpose of protecting the parts against the accumulation of mud and dirt, and preventing grit from getting to the bearing surfaces. If mud collects upon the lower portion of the spindle or standards it will be so far out in the chamber space that it will not reach the lower end of the bearing proper. The top end of the socket is closed at a suitable distance above the end of the moving spindle. The open side space 10 and length of the bearing faces 1 and 2 are of a dimension that will accommodate the flexure of the spring.

The swivel spindles are preferably made hollow through their length, as at 9, except at the upper end, and lateral holes are formed therein from the hollow space to the bearing surfaces; and means, as a grease cup 30, is attached to the lower end opening for forcing lubricant upward within the spindle and out of the holes onto the bearing-surfaces.

The axle-beam 3 may be made horizontally straight its entire length, or with its end portions slightly inclined upward or downward, and the vertical bearing-sockets 5 can be disposed thereon at greater or less elevation, instead of wholly below the level of the axle-beam, as shown, for accommodating the relative height at which it may be desired in any instance to have the body of the vehicle arranged above the ground level.

I claim and desire to secure by Letters Patent—

1. A front suspension means for automobiles, comprising an axle-beam provided at its ends with vertically disposed tubular swivel-bearing sockets having closed tops and open at their bottom ends, and wheel-bearing swivel members having integral upright spindles thereon, movably fitting within said sockets, and a half elliptic spring underlying and supporting said axle-beam and having its ends supported by said swiveling members, substantially as set forth.

2. An axle beam provided at its respective ends with vertically disposed tubular bearing sockets having upper and lower interior bearing faces with an intermediate chamber having a lateral opening, a wheel-axle having a vertical swivel spindle formed with upper and lower cylindrical portions of different diameter, and having an intermediate annular shoulder, a spring centrally secured beneath the axle-beam, and its ends bifurcated and arranged in the openings in said bearing sockets and supported by a seat or washer upon the shoulders of said swivel spindles.

3. A front suspension axle for automobiles, consisting of an axle-beam provided with rearwardly projecting ears for attaching the chassis frame, and having at its ends vertically disposed cylindrical bearing-sockets, in combination with swiveling wheel-supporting members having thereon integral vertical pintle journals that movably fit within said sockets, and a half-elliptic leaf spring centrally secured to the axle-beam and having its ends supported by shoulders or seats upon said swivel-pintles that move endwise within the bearing-sockets.

4. In combination substantially as described, the dual-flanged axle-beam having frame-attaching ears projecting from its rear side, and provided with depending tubular sockets, swiveling wheel-axles having vertical spindles telescoping within said tubular sockets, a semi-elliptic leaf spring extending beneath said axle-beam with its ends resting upon washers carried by shoulders formed on said spindes, said axle-beam carried upon said spring and provided with integral downwardly projecting lugs located at intermediate positions above the respective wings of the spring.

5. In a front suspension mechanism for the purpose set forth, an axle-beam provided at its ends with vertically disposed tubular bearing-sockets, each having an upper bearing portion, a lower bearing portion, and an intermediate spring-receiving space; in combiantion with the swiveling wheel-axles, each provided with a hollow upright swivel-spindle fixed thereto, said spindles having upper and lower journal portions of different diameter fitting within said bearing-sockets, and a spring-supporting ledge and spring seats upon said spindles, a spring carried by the swivel-members and supporting the axle-beam.

6. In a suspension mechanism for motor vehicles, an axle provided with vertically disposed tubular swivel-bearing sockets and a steering knuckle or wheel-bearing swivel-member having an upright spindle thereon for endwise and rotative movement therein, the said bearing-socket being provided with a cylindrical interior bearing surface that matches the surface of the spindle, and having its lower end extended below said bearing-surface and the extended portion chambered of greater diameter than said bearing surface, or the neck of the spindle, for the purpose set forth.

7. A front suspension means for automobiles or the like, comprising an axle-beam provided with vertically disposed tubular bearing-sockets, wheel-axle swivel-members having upright spindles movably fitting within said socket, and a half-elliptic spring arranged beneath said axle-beam and having its ends supported by said swivel members, said bearing sockets being chambered at their lower end with an internal diameter somewhat greater than the diameter of the bearing portion, for the purpose set forth.

8. In a device of the class described, in combination with the axle-beam, a spring underlying said axle-beam, and wheel-axle swiveling members having means for supporting said spring; each of said swiveling members provided with a swivel-spindle fixed thereon having upper and lower journal portions of different diameters, a vertically tubular bearing socket fixed to the end of said axle-beam and having an inclosed top bearing fitting the upper part of said spindle, an intermediate opening and a lower bearing fitting the larger diametered part of said spindle and extended below said bearing with a chambered portion of slightly greater internal diameter than the bearing portion, said swivel spindle being endwise movable within said bearing socket in accord with the flexure of the spring, said swivel-spindle having a hollow interior, and means connected with the wheel-axle member for forcing lubricant up through said spindle.

9. In a front suspension mechanism for motor vehicles, an axle-beam of I-shaped cross-section, having upright hollow cylindrical sockets upon the ends thereof, and backwardly projecting frame attaching lugs, central spring connection ears, and under contact lugs all formed integral as a single structure, in combination with wheel-swiveling members, side frame bars and a spring, arranged substantially as set forth.

Witness my hand this 17th day of June, 1913.

FRANK O. WOODLAND.

Witnesses:
 CHAS. H. BURLEIGH,
 C. S. PUTNAM.